United States Patent
Kawase et al.

(10) Patent No.: US 12,208,975 B2
(45) Date of Patent: Jan. 28, 2025

(54) TRANSPORT SYSTEM, AND TRANSPORT MODULE

(71) Applicant: Mitsubishi Electric Corporation, Tokyo (JP)

(72) Inventors: Tatsuya Kawase, Tokyo (JP); Yasuhiro Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/723,486

(22) PCT Filed: Feb. 2, 2022

(86) PCT No.: PCT/JP2022/004114
§ 371 (c)(1),
(2) Date: Jun. 24, 2024

(87) PCT Pub. No.: WO2023/148859
PCT Pub. Date: Aug. 10, 2023

(65) Prior Publication Data
US 2024/0417192 A1 Dec. 19, 2024

(51) Int. Cl.
*B65G 54/02* (2006.01)
*B65G 43/00* (2006.01)
(Continued)

(52) U.S. Cl.
CPC ............ *B65G 54/02* (2013.01); *B65G 43/00* (2013.01); *H02M 7/537* (2013.01); *H02P 25/06* (2013.01); *H02P 27/06* (2013.01)

(58) Field of Classification Search
CPC ........ B65G 54/02; H02M 7/537; H02P 25/06; H02P 25/07
(Continued)

(56) References Cited

U.S. PATENT DOCUMENTS 5,825,641 A * 10/1998 Mangtani ............... H02P 6/34
  318/400.11
6,952,086 B1 * 10/2005 Krefta .................. H02K 41/025
  318/135
(Continued)

FOREIGN PATENT DOCUMENTS

EP 3447884 A1 * 2/2019 ............ B60L 15/005
JP H09-069435 A 3/1997
(Continued)

OTHER PUBLICATIONS

International Search Report and Written Opinion mailed on Apr. 5, 2022, received for PCT Application PCT/JP2022/004114, filed on Feb. 2, 2022, 10 pages including English Translation.
(Continued)

Primary Examiner — Douglas A Hess
(74) Attorney, Agent, or Firm — XSENSUS LLP (57) ABSTRACT

The transport system includes transport modules each including a coil group and an inverter unit that applies an AC voltage to the coil group. The transport system has at least one carriage having a magnet installed thereon to receive an electromagnetic force from the coil group. Each inverter unit includes an inverter circuit and a diode. The inverter circuit has a DC voltage applied thereto, the DC voltage being output from a DC power supply, and converts the DC voltage into the AC voltage. The diode is connected between the DC power supply and the inverter circuit and disposed to allow a current to flow in a forward direction from a first side of the diode connected to the DC power supply to a second side of the diode opposite to the first side when a potential on the first side is higher than a potential on the second side.

12 Claims, 8 Drawing Sheets

(51) Int. Cl.
*H02M 7/537* (2006.01)
*H02P 25/06* (2016.01)
*H02P 27/06* (2006.01)

(58) Field of Classification Search
USPC ........................................................ 198/619
See application file for complete search history.

(56) References Cited

U.S. PATENT DOCUMENTS

| | | | |
|---|---|---|---|
| 7,026,732 B1 * | 4/2006 | Backman | H02K 41/03 198/619 |
| RE39,747 E * | 7/2007 | Peltier | G01D 5/36 318/135 |
| 8,035,323 B2 * | 10/2011 | Cruise | H02P 6/006 318/135 |
| 8,970,142 B2 * | 3/2015 | Inoue | H02K 41/031 318/119 |
| 10,075,118 B2 * | 9/2018 | Chretien | H02P 1/30 |
| 10,367,404 B2 | 7/2019 | Ozimek et al. | |
| 10,381,958 B2 * | 8/2019 | Das | H02P 6/006 |
| 10,411,619 B2 * | 9/2019 | Li | H02P 29/50 |
| 10,608,469 B2 * | 3/2020 | Floresta | H02J 50/30 |
| 10,651,846 B2 * | 5/2020 | Fukushima | H03K 17/163 |
| 10,875,418 B2 * | 12/2020 | Ishida | H02M 7/5387 |
| 10,951,138 B2 | 3/2021 | Das | |
| 11,309,737 B2 * | 4/2022 | Floresta | H02P 6/04 |
| 11,777,388 B2 * | 10/2023 | Yamamoto | H02P 25/064 318/135 |
| 2012/0019178 A1 | 1/2012 | Kono et al. | |
| 2017/0054400 A1 | 2/2017 | Kumazawa et al. | |
| 2019/0386588 A1 | 12/2019 | Weber et al. | |

FOREIGN PATENT DOCUMENTS

| | | |
|---|---|---|
| JP | H11-355905 A | 12/1999 |
| JP | 2017-042029 A | 2/2017 |
| WO | 2010/131344 A1 | 11/2010 |
| WO | 2020/217272 A1 | 10/2020 |

OTHER PUBLICATIONS

Notice of Reason for Refusal mailed on Jul. 26, 2022, received for JP Application 2022-538284, 11 pages including English Translation.

Notice of Reason for Refusal mailed on Oct. 11, 2022, received for JP Application 2022-538284, 5 pages including English Translation.

Decision to Grant mailed on Nov. 29, 2022, received for JP Application 2022-538284, 5 pages including English Translation.

* cited by examiner

TRANSPORT SYSTEM, AND TRANSPORT MODULE

CROSS-REFERENCE TO RELATED APPLICATION

This application is a national stage application, pursuant to 35 U.S.C. § 371, of International Patent Application No. PCT/JP2022/004114, filed Feb. 2, 2022, the entire contents of which are incorporated herein by reference.

FIELD

The present disclosure relates to a transport system including at least one carriage having a magnet installed thereon to receive an electromagnetic force from a coil group. The present disclosure also relates to a transport module and an inverter unit of the transport system.

BACKGROUND

In general, a factory-automated production line for assembling an industrial product uses a transport system that transports parts etc. within the production line or among a plurality of stations along the production line.

In the transport system, a transport line is divided into a plurality of control zones, a control apparatus is located in each control zone, and a carriage travels between the control zones. Such a transport system is often used in a recent production line because of its superiority in production efficiency.

Patent Literature 1 below discloses a transport system including a guide rail for travelling of a carriage thereon and linear motors having stators arranged in the shape of a track at predetermined intervals along the guide rail, and movable sides having the carriage attached thereto such that the carriage circulates along the track. In this transport system, inverter circuits are connected in one-to-one to the stators, and a single Direct-Current (DC) power supply is connected to a plurality of the inverter circuits.

CITATION LIST

Patent Literature

Patent Literature 1: U.S. Pat. No. 10,367,404

SUMMARY OF INVENTION

Problem to be Solved by the Invention

In the conventional transport system as represented by Patent Literature 1, the positions of the stations are fixed. For this reason, in many cases, this type of transport system provides motion profiles that allow the carriage to only accelerate intermittently in a control zone, only decelerate intermittently in another control zone, and only move at a constant speed at all times in another control zone.

When the carriage accelerates and decelerates at different timings with such motion profiles, regenerative energy generated in the control zone for the deceleration of the carriage is immediately consumed as drive energy of the control zone for the movement of the carriage at a constant speed. Consequently, the regenerative energy generated in the control zone for the deceleration of the carriage is difficult to use as drive energy at the time of acceleration in the control zone for the acceleration of the carriage. This creates the problem of a reduction in power efficiency of the system, and the problem of the need for a selected system having a large power supply capacity in correspondence to the maximum power at the time of acceleration of the carriage.

The present disclosure has been made in view of the foregoing, and an object of the present disclosure is to provide a transport system that can improve power efficiency of the system and reduce upsizing of the system.

Means to Solve the Problem

In order to solve the above problems and achieve an object, a transport system according to the present disclosure comprises: at least two transport modules each including a coil group and an inverter unit to apply an alternating-current voltage to the coil group; and at least one carriage having a magnet installed thereon to receive an electromagnetic force from the coil group. Each of the inverter units includes an inverter circuit and a first diode. The inverter circuit has a direct-current voltage applied thereto, the direct-current voltage being output from a direct-current power supply, and converts the direct-current voltage into the alternating-current voltage. The first diode is connected between the direct-current power supply and the inverter circuit and disposed to allow a current to flow in a forward direction from a first side of the first diode to a second side of the first diode when a potential on the first side is higher than a potential on the second side, the first side being connected to the direct-current power supply, the second side being opposite to the first side.

Effects of the Invention

The transport system according to the present disclosure has an effect of improving the power efficiency of the system and reduce the upsizing of the system.

DESCRIPTION OF EMBODIMENTS

Hereinafter, with reference to the accompanying drawings, a description will be given in detail of a transport system, a transport module, and an inverter unit according to embodiments of the present disclosure. Note that, the embodiments described below are exemplary and are not intended to limit the scope of the present disclosure. Additionally, in the following description, subscripted reference numerals are used to denote a plurality of components of the same type, but subscript notation is appropriately omitted in a case of description or the like focusing on individual functions of the components. Additionally, hereinafter, a physical connection and an electrical connection will not be distinguished from each other and will be simply referred to as "connection". That is, the term "connection" includes both a case where the components are directly connected to each other and a case where the components are indirectly connected to each other via another component.

First Embodiment

Figure 1:
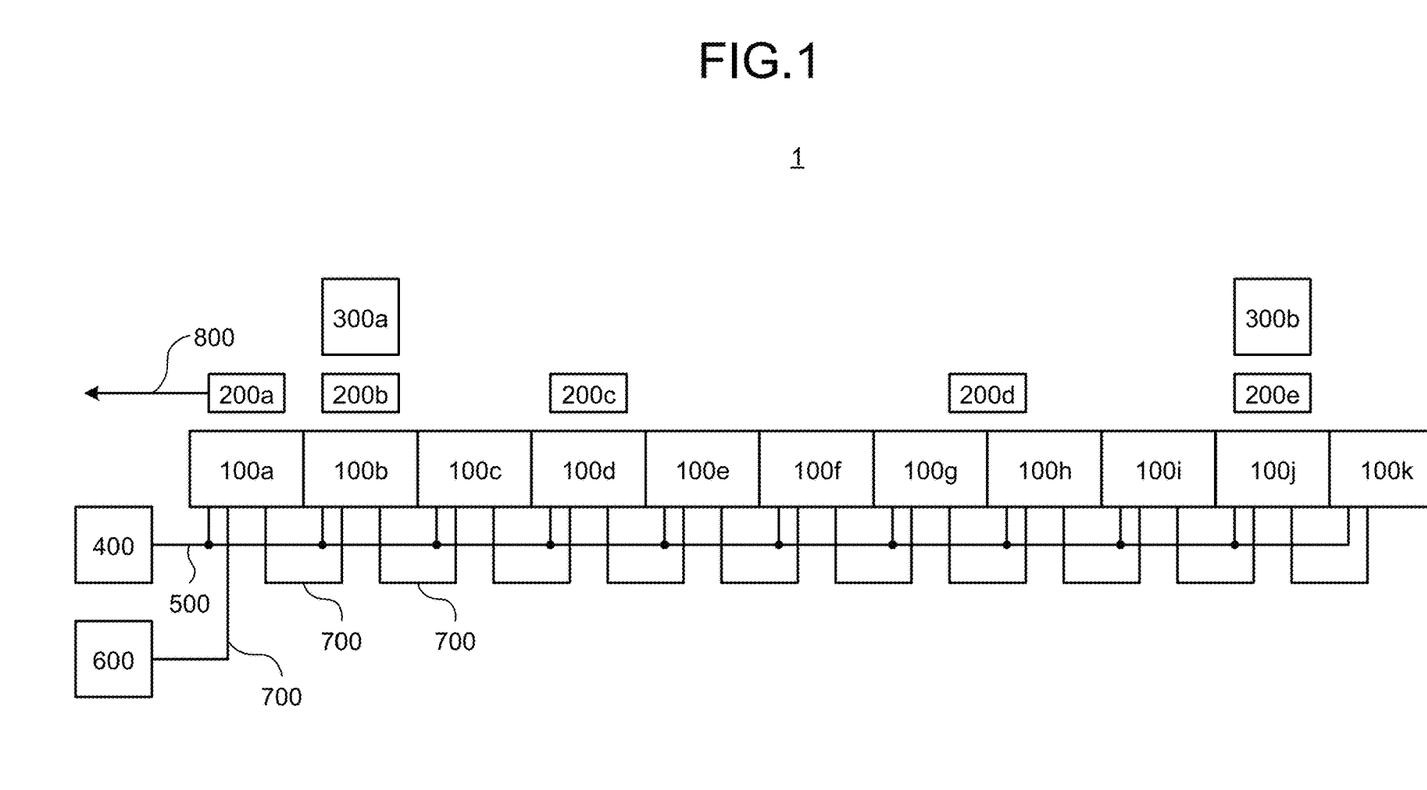
FIG. 1 is a schematic diagram illustrating an example configuration of a transport system common to embodiments of the present disclosure.

A transport system according to the embodiments of the present disclosure is a transport system including at least two transport modules and at least one carriage thrust by a corresponding one of the transport modules. FIG. 1 is a schematic diagram illustrating an example configuration of a transport system 1 common to embodiments of the present disclosure. As illustrated in FIG. 1, the transport system 1 includes a plurality of transport modules 100a to 100k, a plurality of carriages 200a to 200e, a plurality of stations 300a and 300b, a DC power supply 400, and a controller 600.

The DC power supply 400 is a power supply device or a power supply circuit that outputs a predetermined DC voltage. The DC power supply 400 may be any DC power supply that can output a predetermined DC voltage, irrespective of its configuration and voltage conversion method. One or more DC power supplies 400 may be included in the transport system 1. That is, the number of DC power supplies 400 may be two or more.

The DC power supply 400 is connected with each of the transport modules 100a to 100k through a DC power supply line 500. Additionally, the controller 600 and the plurality of transport modules 100 are configured to communicate with each other through a communication cable 700. Note that, although in FIG. 1 the plurality of transport modules 100 are connected to each other in a daisy chain through the communication cable 700, the present embodiment is not limited to this connection style. For example, the transport modules 100 may be bus-connected through the communication cable 700. Additionally, in FIG. 1, the controller 600 and the plurality of transport modules 100 are connected with each other through the communication cable 700, but may be connected wirelessly with each other. That is, the controller 600 and the plurality of transport modules 100 may be configured to communicate with each other through any communication means.

Additionally, in FIG. 1, the plurality of transport modules 100 are arranged linearly, but may be arranged in a curve. That is, the plurality of transport modules 100 may be disposed in any manner so that they are coupled to each other to form one transport path. Thus, the transport path defined by the plurality of transport modules 100 may take a linear form or a closed-loop form. Additionally, in FIG. 1, the transport modules 100 are disposed with no space therebetween, but the present embodiment is not limited thereto. The transport modules 100 may be spaced apart from each other.

The DC power supply 400 supplies driving power to the plurality of transport modules 100. The controller 600 transmits a command to each of the transport modules 100, controls a current flowing to the coil group (not illustrated in FIG. 1) of the transport module 100 to thereby provide thrust to the carriage 200, and controls the operation of the carriage 200.

In FIG. 1, a traveling direction 800 of the carriage 200 can be set for each carriage 200. Each carriage 200 stops at the transport module 100b at which the station 300a is present and the transport module 100j at which the station 300b is present. The stations 300a and 300b, for example, load or unload a transportable object, machine the transportable object, etc. In the other transport modules 100, the carriage 200 travels at a constant speed. The number of carriages 200 that can be controlled at the position of one transport module 100 may be one or two or more.

Figure 2:
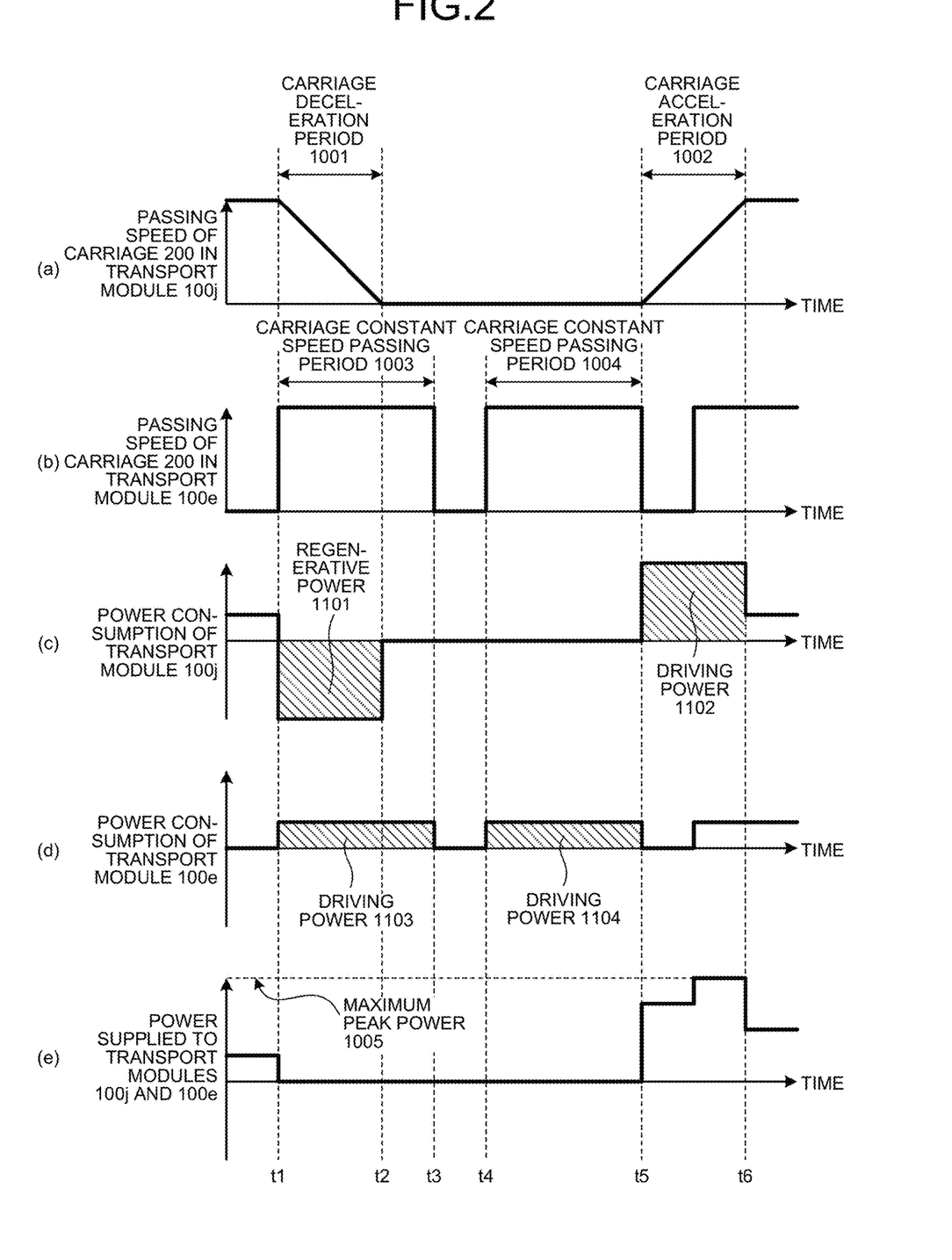
FIG. 2 is a diagram for describing the problems of the present application.

FIG. 2 is a diagram for describing the problems addressed by the present application. Specifically, FIG. 2(a) illustrates the time course of a passing speed of the carriage 200 in the transport module 100j, and FIG. 2(b) illustrates the time course of a passing speed of the carriage 200 in the transport module 100e. FIG. 2(c) illustrates the time course of power consumption of the transport module 100j, and FIG. 2(d) illustrates the time course of power consumption of the transport module 100e. FIG. 2(e) illustrates the time course of power supplied to the transport modules 100j and 100e. Note that the description herein is made assuming that the DC voltage output from the DC power supply 400 is applied to the transport modules 100e and 100j through the DC power supply line 500, as illustrated in FIG. 1.

The operation in FIG. 2 will be described. In FIG. 2, at the position of the transport module 100j, a period from a time t1 to a time t2 is defined as a "carriage deceleration period 1001" during which the passing carriage 200 decelerates. Similarly, at the position of the transport module 100j, a period from a time t5 to a time t6 is defined as a "carriage acceleration period 1002" during which the passing carriage 200 accelerates. Additionally, at the position of the transport module 100e, a period from the time t1 to a time t3 and a period from a time t4 to the time t5 are defined as a "carriage constant speed passing period 1003" and a "carriage constant speed passing period 1004", respectively, during which period the passing carriage 200 passes through at a constant speed.

In the transport module 100j, regenerative power 1101 generated during the carriage deceleration period 1001 is stored in a capacitor (not illustrated in FIG. 1) in the transport module 100j. As described above, since the DC power supply 400 is shared in common, the regenerative power 1101 is consumed as driving power 1103 in the transport module 100e during the carriage constant speed passing period 1003, and is consumed as driving power 1104 in the transport module 100e during the carriage constant speed passing period 1004. Through this operation, the transport module 100e consumes the regenerative power 1101 to drive the carriage 200 at a constant speed in the carriage constant speed passing periods 1003 and 1004, such that the power supplied from the DC power supply 400 to the transport module 100e through the DC power supply line 500 is zero as illustrated in FIG. 2(e). Additionally, during the carriage constant speed passing periods 1003 and 1004, the carriage 200 decelerates at the transport module 100j during the carriage deceleration period 1001 between the time t1 and the time t2, and stops thereat between the time t2 and the time t5, such that the power supplied to the transport module 100j is zero as illustrated in FIG. 2(e). On the other hand, even if the regenerative power 1101 generated during the carriage deceleration period 1001 can be used as the driving power 1103 and the driving power 1104, there is no guarantee that the regenerative power 1101 is used as driving power 1102 of the transport module 100j. Furthermore, in a case where the capacity of the capacitor (not illustrated in FIG. 1) is not sufficiently large, the regenerative power 1101 may increase the voltage of the DC power supply line 500, which leads to a dangerous situation. In such a case, needless to say, the attachment of a further regenerative resistor for consumption of the regenerative power 1101 is probably unavoidable and it is possible that the regenerative power 1101 cannot be guaranteed to be used as the driving power 1103 and the driving power 1104. For this reason, it is necessary to design the system premised on power supply from the DC power supply 400 for the carriage acceleration period 1002. Thus, it is necessary to supply the power of the maximum peak power 1005 to the transport module 100j for the carriage acceleration period 1002. This makes it necessary to increase the power supply capacity of the DC power supply 400 and increase the capacity of the capacitor installed in the transport module 100. This results in a problem of a cost increase of the transport system 1.

Figure 3:
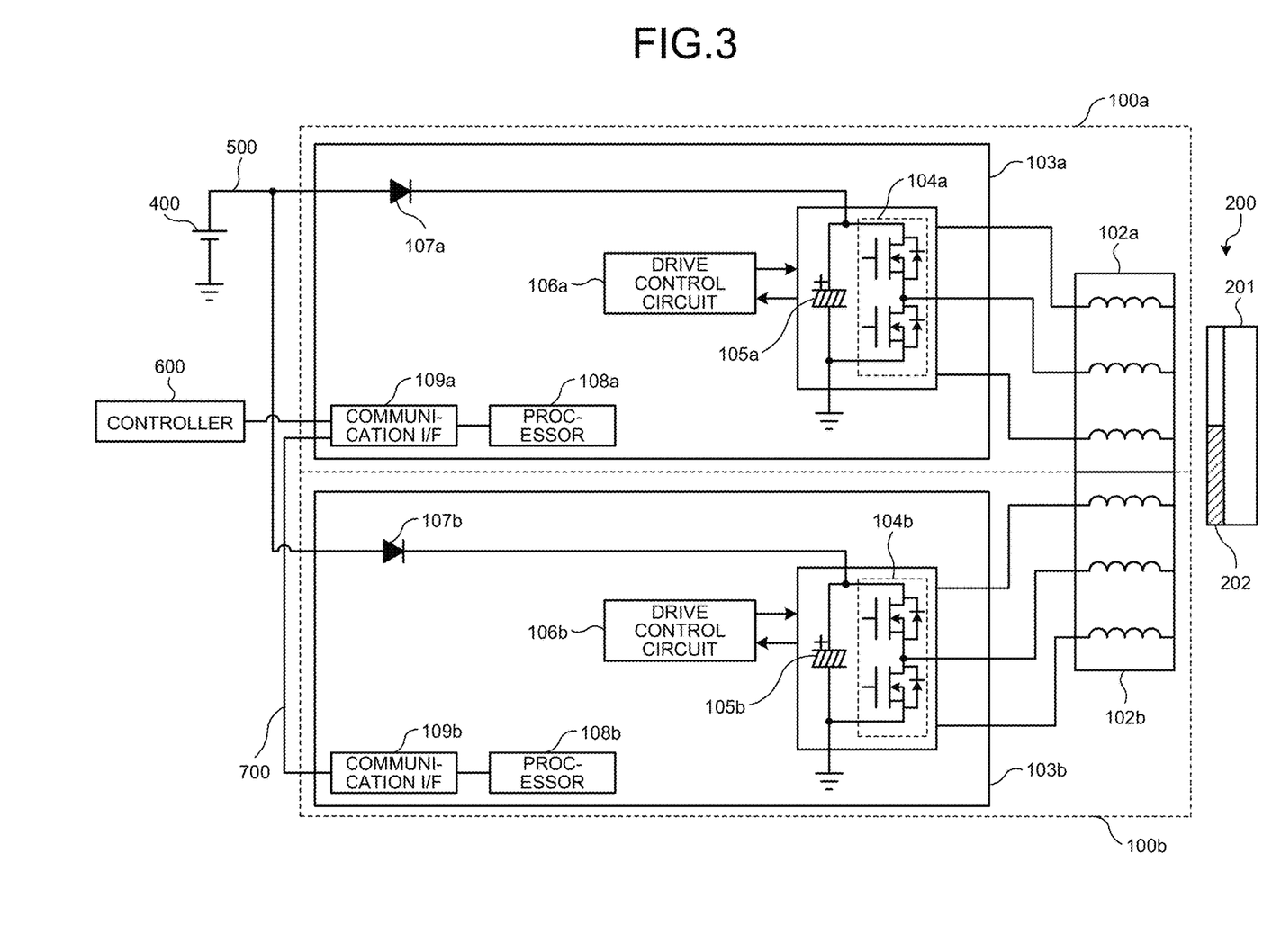
FIG. 3 is a diagram illustrating a configuration example of transport modules according to a first embodiment.

In order to solve this problem, the transport system 1 according to a first embodiment includes the transport modules 100 having configurations illustrated in FIG. 3. FIG. 3 is a diagram illustrating an example configuration of the transport modules 100 according to the first embodiment. FIG. 3 illustrates two transport modules 100a and 100b and one carriage 200. The transport module 100a includes a coil group 102a and an inverter unit 103a. The transport module 100b includes a coil group 102b and an inverter unit 103b. Note that, for convenience, although FIG. 3 illustrates the two transport modules 100a and 100b, the configuration of the transport system like the transport system 1 illustrated in FIG. 1 includes the transport modules 100a to 100k each including a coil group 102 and an inverter unit 103. That is, the transport system 1 illustrated in FIG. 1 exemplifies the transport system including eleven transport modules 100. The carriage 200 includes a carriage housing 201 and a magnet 202 installed in the carriage housing 201. The carriage 200 travels under the electromagnetic force applied from the coil groups 102a and 102b to the magnet 202. Note that, although not illustrated in FIG. 3, the transport modules 100a and 100b each include a guide rail and a position detection element, and the carriage 200 includes a position detection head. The guide rail is a rail that allows the carriage 200 to travel thereon and is set along the traveling direction 800. The position detection head is a sensor for detecting a traveling position of the carriage 200. An example of the position detection head includes an optical sensor or a magnetic sensor, but may include a sensor other than the foregoing. The position detection element is an element having a position identifier installed thereon, the position identifier being read by the position detection head. An example of the position identifier includes a magnet, a barcode, a two-dimensional barcode, or the like, but may include a position identifier other than the foregoing.

The inverter unit 103 is a power converter that converts, on the basis of a command from the controller 600, a DC voltage output from the DC power supply 400 into an Alternating-Current (AC) voltage and applies the converted AC voltage to the corresponding coil group 102. In order to implement this function, the inverter unit 103a includes an inverter circuit 104a, a capacitor 105a, a drive control circuit 106a, a diode 107a, a processor 108a, and a communication interface (I/F) 109a. The inverter unit 103b is configured similarly to the inverter unit 103a. That is, the inverter unit 103b includes an inverter circuit 104b, a capacitor 105b, a drive control circuit 106b, a diode 107b, a processor 108b, and a communication I/F 109b.

The diode 107 is disposed such that the anode is connected to the DC power supply 400 and the cathode is connected to the inverter circuit 104. That is, the diode 107 is connected between the DC power supply 400 and the inverter circuit 104, and is disposed to allow a current to flow in a forward direction from a first side of the diode 107 to a second side of the diode 107 when a potential on the first side is higher than a potential on the second side, the first side being connected to the DC power supply 400, the second side not being connected to the DC power supply 400, that is, being opposite to the first side. Note that, as used herein, the diode 107 may be referred to as a "first diode".

The inverter circuit 104 includes switching elements of upper and lower arms connected in series. The drive control circuit 106 controls the conduction states, i.e., On/Off states of these switching elements. A DC voltage output from the DC power supply 400 is applied to the inverter circuit 104. The inverter circuit 104 converts the DC voltage into an AC voltage, and applies the AC voltage to each of coils of the coil group 102. FIG. 3 illustrates only one leg including the switching elements of upper and lower arms, and omits the illustration of the other two legs. Note that, FIG. 3 illustrates the coil group 102 defining a three-phase coil, but the present embodiment is not limited thereto. The coil group 102 may define a single-phase coil or have four or more phases. In this case, the inverter circuit 104 is an inverter circuit having a main circuit suitable for the configuration of the coil group 102.

The capacitor 105 is connected in parallel to opposite ends of the inverter circuit 104. An example of the capacitor 105 includes the electrolytic capacitor illustrated, but may include a capacitor other than the electrolytic capacitor. The capacitor 105 smooths and holds the DC voltage output from the DC power supply 400.

The processor 108 controls the drive control circuit 106 and performs necessary communication and information exchange with the controller 600 through the communication I/F 109. The processor 108 may be a processor known as a microprocessor, a microcomputer, a Central Processing Unit (CPU), or a Digital Signal Processor (DSP).

Figure 4:
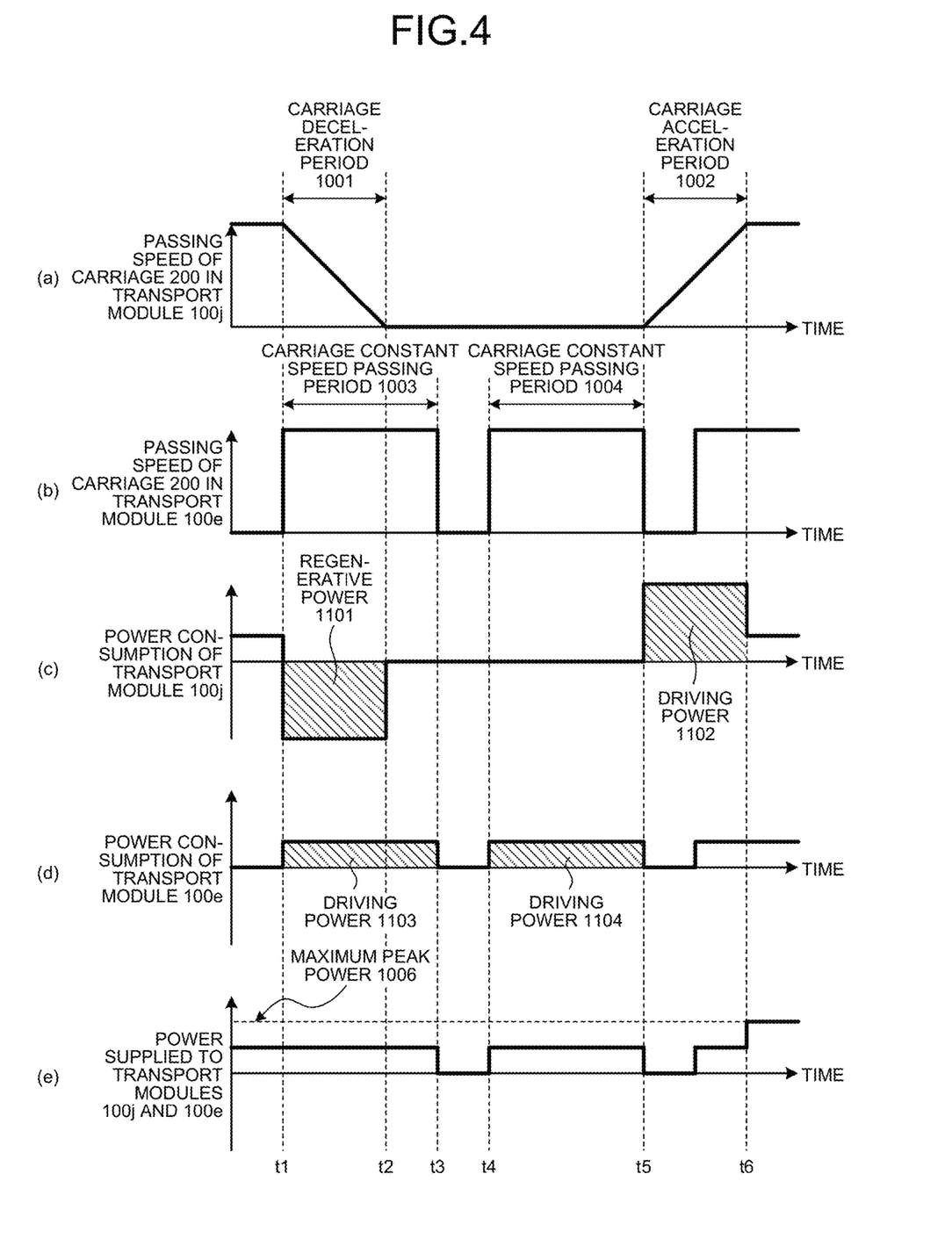
FIG. 4 is a diagram for describing an operation of the transport system according to the first embodiment.

FIG. 4 is a diagram for describing an operation of the transport system 1 according to the first embodiment. Operation waveforms illustrated in FIG. 4 and the order of display of the operation waveforms are the same as those illustrated in FIG. 2. Additionally, in FIG. 4, the motion profiles of the passing speed of the carriage 200 in the transport modules 100b and 100j are the same as those illustrated in FIG. 2.

FIG. 4 differs from FIG. 2 in the operation waveform illustrated in (e) of FIG. 4. Specifically, the maximum peak power 1006 illustrated in FIG. 4 is lower than the maximum peak power 1005 illustrated in FIG. 2.

In the transport module 100j, the regenerative power 1101 generated during the carriage deceleration period 1001 does not flow into the transport module 100e through the DC power supply line 500 because of the effect of the diode 107. With this action, the regenerative power 1101 generated during the carriage deceleration period 1001 is temporarily stored in the capacitor 105 in the transport module 100j. Consequently, during the carriage acceleration period 1002, the transport module 100j can use the regenerative power 1101 stored in the capacitor 105. Unlike the case of FIG. 2, since the transport module 100e cannot use the regenerative power 1101, the driving power 1103 and the driving power 1104 for causing the carriage 200 to travel at a constant speed are supplied from the DC power supply 400 or the capacitor 105 of the transport module 100e as illustrated in the lower part of FIG. 4. On the other hand, the regenerative power 1101 stored in the capacitor 105 of the transport module 100j can be used in the transport module 100j during the carriage acceleration period 1002. Consequently, although the transport module 100e requires power supply from the DC power supply 400, the transport system 1 can make the maximum peak power 1006 lower than the maximum peak power 1005 illustrated in FIG. 2. That is, it becomes possible to reduce the cost increase of the transport system 1 because the transport system 1 according to the first embodiment eliminates the necessities of increasing the power supply capacity of the DC power supply 400 and the capacity of the capacitor 105 installed in the transport module 100 in accordance with the maximum peak power. Note that, the capacitor 105 may not necessarily be installed in each of the transport modules 100j and 100e, and the transport module 100j may be configured to use the regenerative power 1001 during the carriage acceleration period 1002 as a result of the effect of the diodes 107 in the transport modules 100j and 100e.

As described above, according to the transport system and the transport module according to the first embodiment, the transport system includes the at least two transport modules that apply the AC voltages to the coil groups and each include the inverter unit that applies the AC voltage to the coil group and imparts the driving force to the carriage having the magnet installed thereon, the magnet receiving the electromagnetic force from the coil group. Each of the inverter units includes the inverter circuit and the inverter circuit includes the first diode disposed to allow the current to flow in the forward direction from the first side to the second side when the potential on the first side is higher than the potential on the second side, the first side being connected to the DC power supply, the second side being opposite to the first side. Providing the first diode makes it possible to avoid the regenerative power generated in the own transport module from being used by other transport modules sharing the DC power supply line. This enables the transport module to use the regenerative power generated therein as its own driving power. As a result, the maximum peak power, which is the maximum value of the driving power required for the DC power supply, can be lowered. This can improve the power efficiency of the system and reduce the upsizing of the system.

Additionally, according to the transport system and the transport module according to the first embodiment, since the maximum peak power required for the DC power supply can be lowered, the power supply capacity of the DC power supply can be reduced. This can reduce the cost of the system. Additionally, the first diode, which is connected to the DC power supply in the forward direction as described above, blocks the current flowing through the inverter circuit when the polarity of the DC power supply is incorrectly connected to the transport module. This can bring about an effect of protecting the transport module from damage due to erroneous connection of the polarity of the DC power supply.

Second Embodiment

A description will next be given of a transport system, a transport module, and an inverter unit according to a second embodiment. Note that, configurations of the transport system 1 and the transport module 100 according to the second embodiment are the same as those according to the first embodiment, and a description thereof will be omitted.

Figure 5:
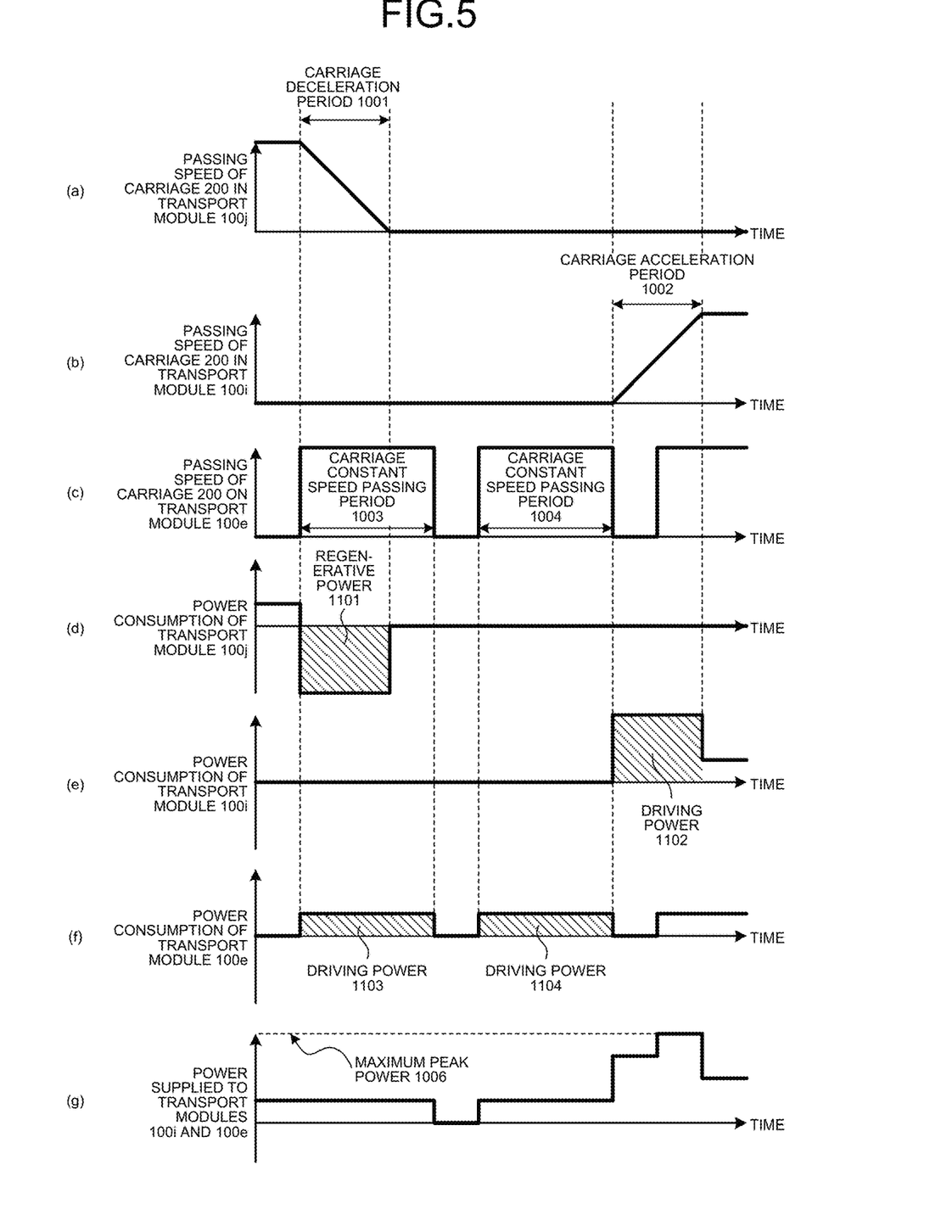
FIG. 5 is a diagram for describing an operation before improvement in a second embodiment.

FIG. 5 is a diagram for describing an operation before improvement in the second embodiment. FIGS. 2 and 4 illustrate the motion profiles in the case where the transport module 100 responsible for acceleration of the carriage 200 and the transport module 100 responsible for deceleration of the carriage are the same. On the other hand, FIG. 5 illustrates motion profiles in a case where the transport module 100 responsible for acceleration of the carriage 200 and the transport module 100 responsible for deceleration of the carriage are different from each other. Specifically, FIG. 5(a) illustrates the time course of the passing speed of the carriage 200 in the transport module 100j, FIG. 5(b) illustrates the time course of the passing speed of the carriage 200 in the transport module 100i, and FIG. 5(c) illustrates the time course of the passing speed of the carriage 200 in the transport module 100e. FIG. 5(d) illustrates the time course of the power consumption of the transport module 100j, FIG. 5(e) illustrates the time course of the power consumption of the transport module 100i, and FIG. 5(f) illustrates the time course of the power consumption of the transport module 100e. FIG. 5(g) illustrates the time course of power supplied to the transport modules 100i and 100e. Note that, in FIG. 5, contents that are the same as or equivalent to those in FIG. 2 are denoted by the same reference numerals and signs.

In FIG. 5, the transport module 100j is responsible for deceleration of the carriage 200, and the transport module 100i is responsible for acceleration of the carriage 200. Additionally, at the transport module 100e, the carriage 200 moves at a constant speed. That is, the carriage 200 decelerates at the transport module 100j, moves at a constant speed past the transport module 100e, and accelerates at the transport module 100i.

In the transport module 100j, the regenerative power 1101 generated during the carriage deceleration period 1001 is temporarily stored in the capacitor 105 in the transport module 100j without flowing back to the DC power supply line 500 because of the action of the diode 107 in the transport module 100j, and is consumed by natural discharge or forced discharge. Thus, the regenerative power 1101 generated in the transport module 100j cannot be used as the driving power 1102 of the transport module 100i or as the driving power 1103 and the driving power 1104 of the transport module 100e. Thus, in the motion profiles in FIG. 5, there is left a room for improvement in the operation of the transport system 1 in terms of power supply efficiency and power supply capacity.

Figure 6:
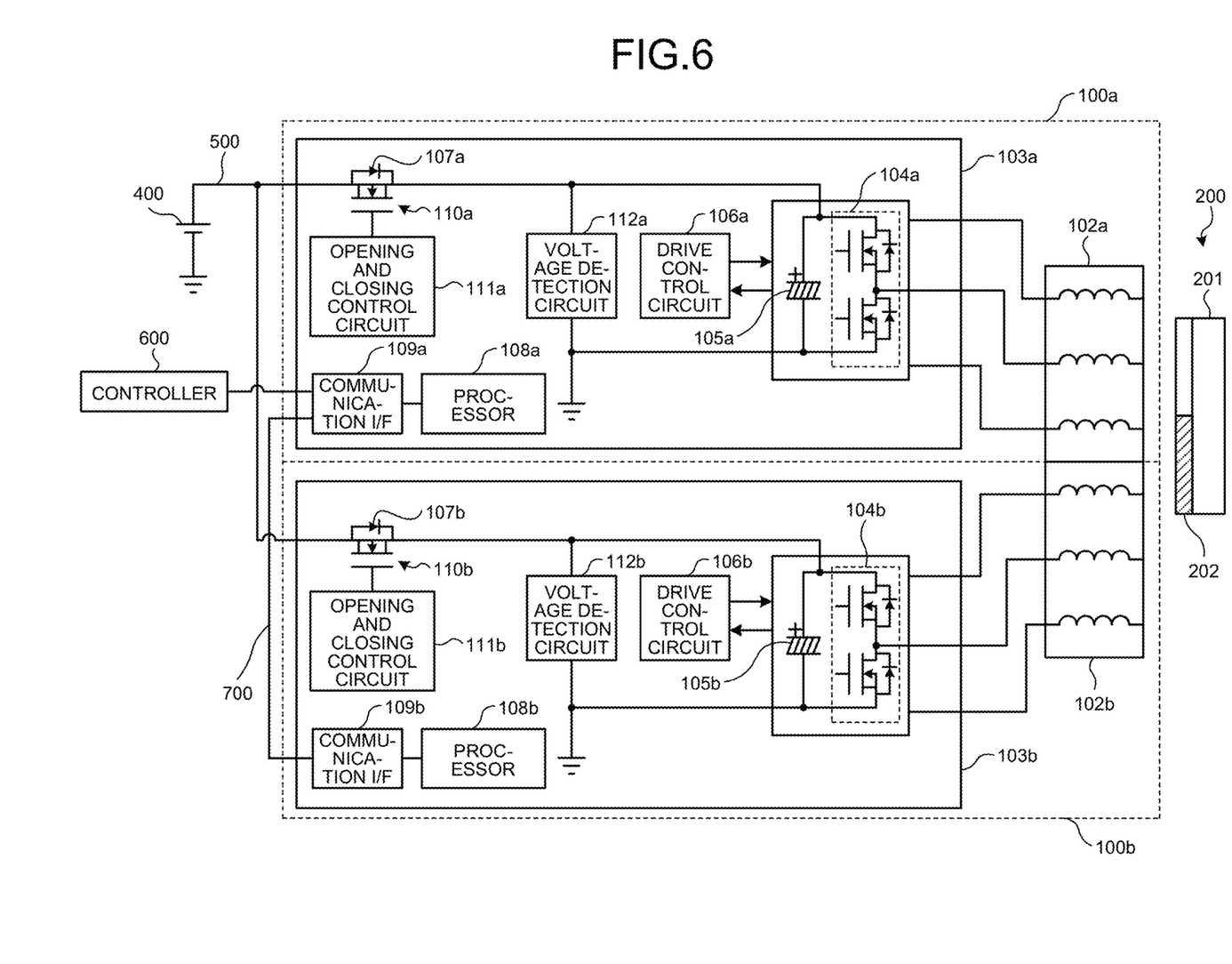
FIG. 6 is a diagram illustrating an example configuration of transport modules according to the second embodiment.

In view of this, the second embodiment aims to improve the power supply efficiency and power supply capacity. Specifically, the transport system 1 according to the second embodiment includes the transport modules 100 having configurations illustrated in FIG. 6. FIG. 6 is a diagram illustrating an example configuration of the transport modules 100 according to the second embodiment. Note that, for convenience, although FIG. 6 illustrates the two transport modules 100a and 100b similarly to FIG. 3, the configuration of the transport system like the transport system 1 illustrated in FIG. 1 includes the transport modules 100a to 100k each including the coil group 102 and the inverter unit 103. That is, the transport system 1 illustrated in FIG. 1 exemplifies the transport system including 11 transport modules 100. Additionally, in FIG. 6, components that are the same as or equivalent to those of the transport module 100 according to the first embodiment illustrated in FIG. 3 are denoted by the same reference numerals and signs, and overlapping contents are appropriately omitted.

As can be seen from a comparison of the configuration illustrated in FIG. 6 and that in FIG. 3, the transport module 100a further includes a switching element 110a, an opening and closing control circuit 111a, and a voltage detection circuit 112a. The transport module 100b is configured similarly to the transport module 100a, and further includes a switching element 110b, an opening and closing control circuit 111b, and a voltage detection circuit 112b.

The switching element 110 is connected in parallel to opposite ends of the diode 107. Note that, the diode 107 and the switching element 110, which are connected in parallel to each other, may be combined and configured in the form of a Metal Oxide Semiconductor Field Effect Transistor (MOSFET). That is, the diode 107 may utilize a body diode of the MOSFET. The opening and closing control circuit 111 controls the conduction state of the switching element 110 in accordance with instructions from the processor 108. The voltage detection circuit 112 detects the voltage of the capacitor 105 and outputs a detection value to the processor 108. Note that, as used herein, the switching element 110 may be referred to as a "first switching element".

A description will next be given of some control methods in the second embodiment using the transport module 100 illustrated in FIG. 6. Note that, the motion profiles of the passing speed are the same as those illustrated in FIG. 5.

First, a first control method will be described. The first control method is a method using the motion profiles of the carriage 200 illustrated in FIGS. 5(a) to 5(c).

In the transport module 100j, the regenerative power 1101 generated during the carriage deceleration period 1001 is temporarily stored in the capacitor 105 in the transport module 100j. On the basis of the information on the motion profiles of the carriage 200, the controller 600 transmits a closing command for energizing the switching element 110 in the transport module 100j at the same time as the beginning of the carriage acceleration engine 1002 at the transport module 100i having the carriage acceleration period 1002. For example, as illustrated in FIG. 5, the transport module 100j is only responsible for deceleration of the carriage 200 and the regenerative power 1101 stored in the capacitor 105 in the transport module 100j is not consumed for use in the operation of the carriage 200, in which case on the basis of the closing command transmitted from the controller 600, the processor 108 in the transport module 100j controls the switching element 110 in the transport module 100j such that the switching element 110 comes into conduction. The closing command transmitted from the controller 600 to the processor 108 in the transport module 100j is executed at the start timing of the carriage acceleration period 1002. Needless to say, the command is executed taking into consideration a transmission time between the controller 600 and the processor 108 in the transport module 100j, a processing time of the processor 108, etc. Under the above control, the regenerative power 1101 stored in the capacitor 105 in the transport module 100j can be used as the driving power 1102 of the transport module 100i. This can lower the maximum peak power 1006 required for the DC power supply 400, improve the power efficiency of the system, and reduce the upsizing of the system.

Figure 7:
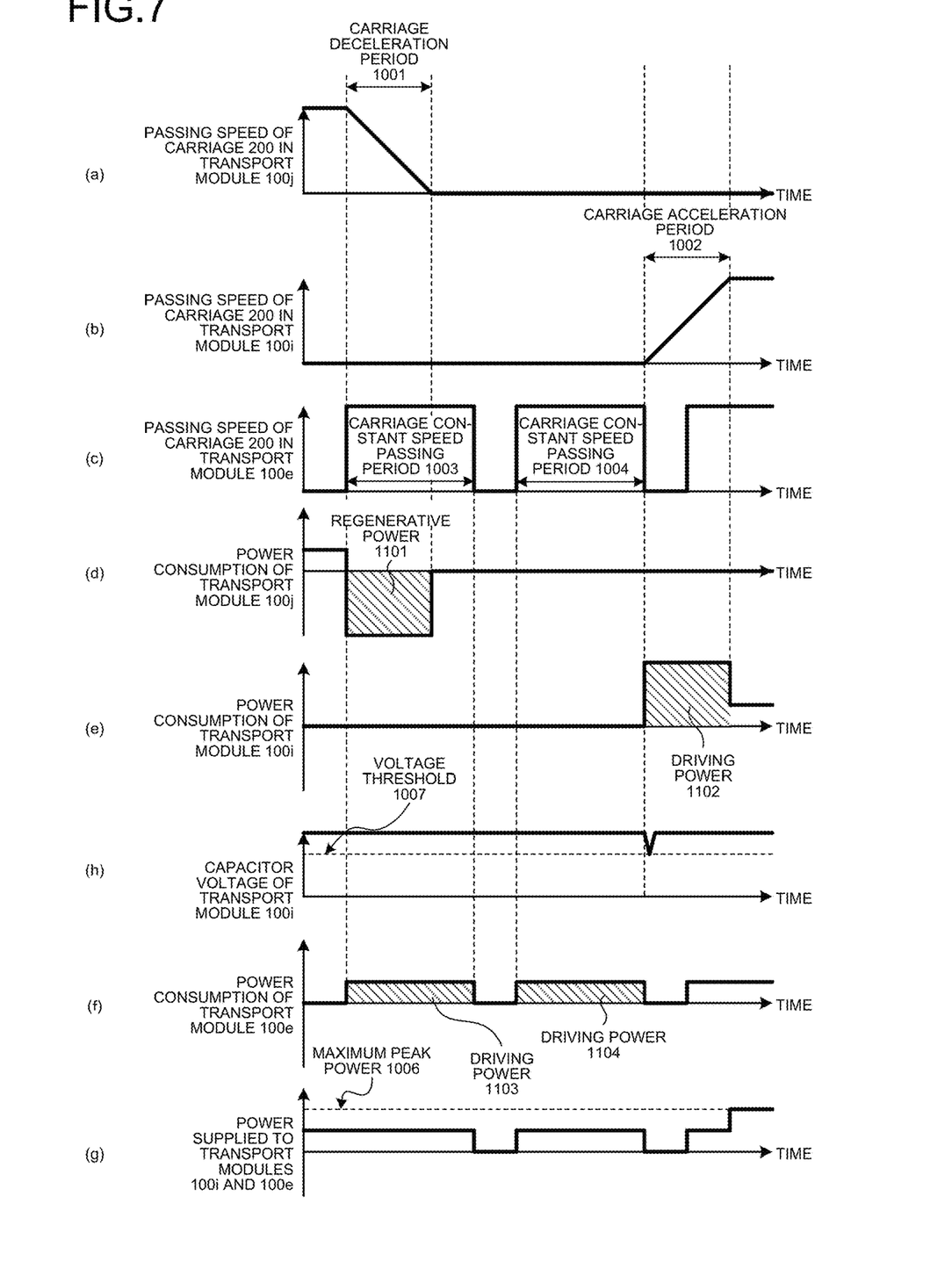
FIG. 7 is a diagram for describing a second control method in the second embodiment.

Next, a second control method will be described. FIG. 7 is a diagram for describing the second control method in the second embodiment. The second control method is a method using the detection value from the voltage detection circuit 112.

The items of the operation waveforms in (a) to (g) in FIG. 7 are the same as those in FIG. 5. Additionally, the motion profiles of the passing speeds in the transport modules 100e, 100i, and 100j are the same as those illustrated in FIG. 5. On the other hand, in FIG. 7, a waveform (h) of the capacitor voltage of the transport module 100i is illustrated between the operation waveforms (e) and (f). The capacitor voltage is a voltage of the capacitor 105. Note that, the electrical wiring interconnecting the DC power supply 400 and the inverter circuit 104 is generally referred to as a "DC bus", and the capacitor 105 is also often connected to the DC bus. For this reason, the capacitor voltage may be referred to as a "bus voltage".

In the carriage acceleration period 1002, since the carriage 200 is accelerated by the transport module 100i, the capacitor voltage of the capacitor 105 in the transport module 100i rapidly decreases. This voltage decrease is detected on the basis of the detection value from the voltage detection circuit 112 in the transport module 100i. When the capacitor voltage of the capacitor 105 in the transport module 100i falls below a voltage threshold 1007, the processor 108 in the transport module 100i notifies the controller 600 of an excess notification that is information indicating that the capacitor voltage falls below the voltage threshold 1007. The voltage threshold 1007 is a preset lower limit value, that is, a predetermined lower limit value. Upon receiving the excess notification, the controller 600 transmits, to the transport module 100j responsible for deceleration of the carriage 200, the closing command to close the switching element 110 in the transport module 100j. In the example of FIG. 7, the closing command is transmitted to the transport module 100j. In the transport module 100j having the closing command transmitted thereto, the regenerative power 1101 stored in the capacitor 105 in the transport module 100j is discharged by the potential difference, and can be used as the driving power 1102 of the transport module 100i through the DC power supply line 500. Consequently, the maximum peak power 1006 required for the DC power supply 400 can be made lower than the maximum peak power 1006 illustrated in FIG. 5.

Note that, in the second control method described above, the processor 108 transmits the excess notification when the capacitor voltage falls below the voltage threshold 1007, but the present embodiment is not limited to this processing. The processor 108 may notify the controller 600 of information on the capacitor voltage at regular intervals. In this case, the controller 600 detects the capacitor voltage falling below the voltage threshold 1007.

Additionally, in the second control method, the processor 108 transmits the excess notification when the capacitor voltage falls below the voltage threshold 1007, but may transmit the excess notification when the capacitor voltage exceeds a predetermined upper limit value. In this way, it is possible to prevent an overvoltage of the capacitor 105 that may be caused by over regeneration etc. This can reduce the electrical stress that the capacitor 105 will undergo and reduce deterioration of the capacitor 105, thus resulting in extended life of the capacitor 105.

As described above, according to the transport system and the transport module according to the second embodiment, the inverter unit includes the first switching element connected in parallel to opposite ends of the first diode and the opening and closing control circuit that controls the opening and closing of the first switching element. The inverter unit further includes the voltage detection circuit that detects the bus voltage. The opening and closing control circuit controls the opening and closing of the first switching element when the detection value of the bus voltage detected by the voltage detection circuit exceeds the predetermined upper limit value or falls below the predetermined lower limit value. Since the regenerative power stored in the capacitor in a certain transport module can be used as the driving power of another transport module under that control, the maximum peak power required for the DC power supply can be lowered. This can improve the power efficiency of the system and reduce the upsizing of the system. Additionally, since the power supply capacity of the DC power supply can be reduced, the cost of the system can be reduced.

Additionally, the transport system according to the second embodiment includes the controller that controls the operation of each inverter unit. The controller receives, from the inverter unit, the excess notification indicating that the detection value of the bus voltage exceeds the predetermined upper limit value or falls below the predetermined lower limit value, and controls the operation of the opening and closing control circuit in the inverter unit. Since the regenerative power stored in the capacitor in a certain transport module can be used as the driving power of another transport module under this control, the maximum peak power required for the DC power supply can be lowered. This can improve the power efficiency of the system and reduce the upsizing of the system.

Note that, instead of the above control, each inverter unit may notify the controller of the detection value of the bus voltage, and the controller may control, on the basis of this detection value of the bus voltage, the operation of the opening and closing control circuit in at least one of the inverter units. Even in this way, the above-described actions and effects can be obtained.

Alternatively, instead of the above control, the controller may control the operation of the opening and closing control circuit in the at least one inverter unit on the basis of the motion profiles of the carriage. Even in this way, the above-described actions and effects can be obtained.

Third Embodiment

A description will next be given of a transport system, a transport module, and an inverter unit according to a third embodiment. The third embodiment discloses a configuration for reducing an inrush current that may occur at the time a DC voltage is applied to the transport module 100. Note that, configurations of the transport system 1 and the transport module 100 according to the third embodiment are the same as those according to the first embodiment or the second embodiment, and a description thereof will be omitted.

Figure 8:
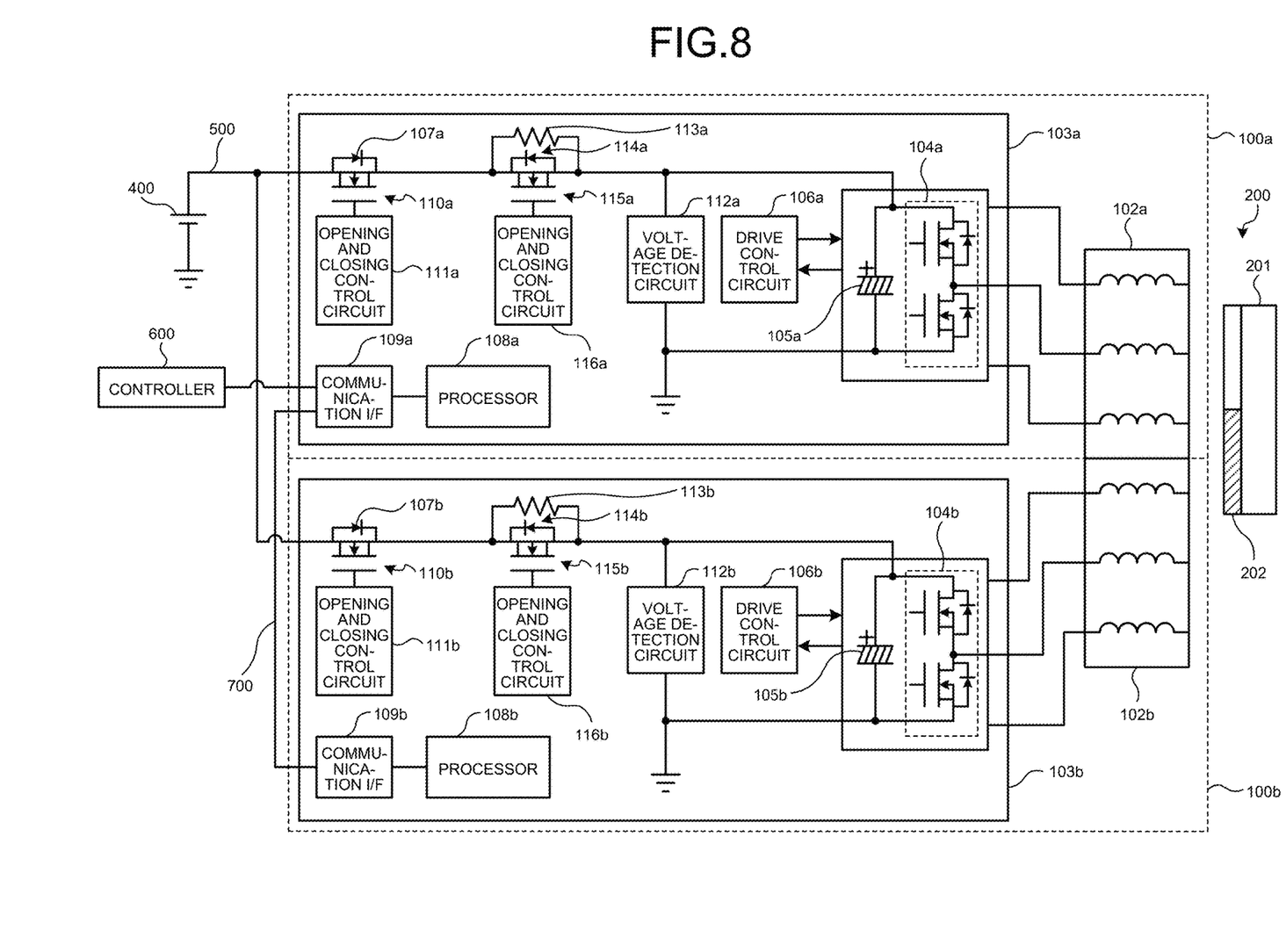
FIG. 8 is a diagram illustrating an example configuration of transport modules according to a third embodiment.

FIG. 8 is a diagram illustrating a configuration example of the transport modules 100 according to the third embodiment. Note that, for convenience, although FIG. 8 illustrates the two transport modules 100a and 100b similarly to FIG. 3 and FIG. 6, the configuration of the transport system like the transport system 1 illustrated in FIG. 1 includes the transport modules 100a to 100k each including the coil group 102 and the inverter unit 103. That is, the transport system 1 illustrated in FIG. 1 exemplifies the transport system including eleven transport modules 100. Additionally, in FIG. 8, components that are the same as or equivalent to those of the transport module 100 according to the second embodiment illustrated in FIG. 6 are denoted by the same reference numerals and signs, and overlapping contents are appropriately omitted.

As can be seen from a comparison of the configuration illustrated in FIG. 8 and that in FIG. 6, the transport module 100a further includes an inrush current reduction resistor 113a, a diode 114a, a switching element 115a, and an opening and closing control circuit 116a. The transport module 100b is configured similarly to the transport module 100a, and further includes an inrush current reduction resistor 113b, a diode 114b, a switching element 115b, and an opening and closing control circuit 116b.

The inrush current reduction resistor 113 is connected in series to the switching element 110 to reduce the inrush current flowing to the inverter circuit 104. In FIG. 8, the inrush current reduction resistor 113 is disposed at a stage following the switching element 110, but may be disposed at a stage preceding the switching element 110. That is, the inrush current reduction resistor 113 may be connected in series to the switching element 110 between the DC power supply 400 and the inverter circuit 104. The diode 114 and the switching element 115 are connected in parallel to each other and to the inrush current reduction resistor 113. The diode 114 and the diode 107 are connected in directions opposite to each other. That is, the diode 114 is disposed to allow a current to flow in a forward direction from a fourth side of the diode 114 to a third side of the diode 114 when a potential on the third side is lower than a potential on the fourth side, the third side being connected to the DC power supply 400, the fourth side being not connected to the DC power supply 400, that is, being opposite to the third side. Note that, the diode 114 and the switching element 115, which are connected in parallel to each other, may be combined and configured in the form of a MOSFET. That is, the diode 114 may utilize a body diode of the MOSFET. The opening and closing control circuit 116 controls the conduction state of the switching element 115 in accordance with instructions from the processor 108. Note that, as used herein, the diode 114 may be referred to as a "second diode", and the switching element 115 may be referred to as a "second switching element".

A description will next be given of an operation of the transport system 1 according to the third embodiment. First, upon starting power supply to the transport module 100, the DC power supply 400 is controlled to be turned on. At this timing, the switching element 115 is in an open state. When the switching element 115 is in the open state, the inrush current flowing from the DC power supply 400 to the inverter unit 103 flows into the inrush current reduction resistor 113. This operation can prevent a sudden flow of current into the capacitor 105. This can prevent failure of the capacitor 105 due to the inrush current. When a certain amount of time has elapsed since the inflow of the inrush current starts or when the capacitor voltage of the capacitor 105 exceeds a certain threshold, the processor 108 performs controls the switching element 115 such that the switching element 115 becomes a closed state. This causes the current supplied from the DC power supply 400 to the inverter unit 103 to flow to the switching element 115. Since an on-resistance of the switching element 115 is smaller than a resistance value of the inrush current reduction resistor 113, power consumption in the inverter unit 103 can be reduced.

As described above, according to the transport system and the transport module according to the third embodiment, the inverter unit includes the inrush current reduction resistor that reduces the inrush current flowing to the inverter circuit, the second switching element connected in parallel to the inrush current reduction resistor, and the second diode connected in parallel to both the inrush current reduction resistor and the second switching element. This configuration can reduce the inrush current flowing to the transport module at the timing at which to turn the DC power supply on. This can prevent failure of the capacitor due to the inrush current in addition to providing the effects of the first and second embodiments described above.

Note that, the configurations described in the above embodiments are illustrative only and may be combined with the other known techniques, the embodiments may be combined with each other, and part of each of the configurations may be omitted or modified without departing from the gist.

REFERENCE SIGNS LIST 1 transport system; 100, 100a to 100k transport module; 102, 102a, 102b coil group; 103, 103a, 103b inverter unit; 104, 104a, 104b inverter circuit; 105, 105a, 105b capacitor; 106, 106a, 106b drive control circuit; 107, 107a, 107b, 114, 114a, 114b diode; 108, 108a, 108b processor; 109, 109a, 109b communication I/F; 110, 110a, 110b, 115, 115a, 115b switching element; 111, 111a, 111b, 116, 116a, 116b opening and closing control circuit; 112, 112a, 112b voltage detection circuit; 113, 113a, 113b inrush current reduction resistor; 200, 200a to 200e carriage; 201 carriage housing; 202 magnet; 300a, 300b station; 400 DC power supply; 500 DC power supply line; 600 controller; 700 communication cable; 800 traveling direction; 1001 carriage deceleration period; 1002 carriage acceleration period; 1003, 1004 carriage constant speed passing period; 1005, 1006 maximum peak power; 1007 voltage threshold; 1101 regenerative power; 1102, 1103, 1104 driving power.

The invention claimed is:

1. A transport system comprising:
a plurality of transport modules each including a coil group and an inverter unit to apply an alternating-current voltage to the coil group; and
at least one carriage having a magnet installed thereon to receive an electromagnetic force from the coil group, wherein
each of the inverter units includes:
an inverter circuit to have a direct-current voltage applied thereto, the direct-current voltage being output from a common direct-current power supply, and to convert the direct-current voltage into the alternating-current voltage;
a capacitor connected in parallel to the inverter circuit at a side of the direct-current power supply as viewed from the inverter circuit;
a first diode connected between the direct-current power supply and the inverter circuit and disposed to allow a current to flow in a forward direction from a first side of the first diode to a second side of the first diode when a potential on the first side is higher than a potential on the second side, the first side being connected to the direct-current power supply, the second side being opposite to the first side; and
a first switching element connected in parallel to opposite ends of the first diode, wherein
where one of the plurality of transport modules is defined as a first transport module,
the capacitor included in the first transport module stores regenerative power generated when the carriage passes decelerating through the first transport module, and
the first switching element included in the first transport module is closed when the regenerative power stored in the capacitor is used as driving power of a transport module other than the first transport module.

2. The transport system according to claim 1, wherein each of the inverter units includes:
an opening and closing control circuit to control opening and closing of the first switching element; and
a voltage detection circuit to detect a bus voltage that is a voltage of electrical wiring bus interconnecting the first diode and the inverter circuit, and
each of the opening and closing control circuits closes the first switching element when a detection value of the bus voltage detected by the voltage detection circuit exceeds a predetermined upper limit value or falls below a predetermined lower limit value.

3. The transport system according to claim 2, wherein each of the inverter units includes:
an inrush current reduction resistor connected in series to the first switching element between the direct-current power supply and the inverter circuit and to reduce an inrush current flowing to the inverter circuit;
a second switching element connected in parallel to the inrush current reduction resistor; and
a second diode connected in parallel to both the inrush current reduction resistor and the second switching element, and disposed to allow a current to flow in a forward direction from a fourth side of the second diode to a third side of the second diode when a potential on the third side is lower than a potential on the fourth side, the third side being connected to the direct-current power supply, the fourth side being opposite to the third side.

4. The transport system according to claim 1, comprising a controller to control an operation of each of the inverter units, wherein
the controller is configured to communicate with each of the inverter units,
each of the inverter units includes:
an opening and closing control circuit to control opening and closing of the first switching element; and
a voltage detection circuit to detect a bus voltage that is a voltage of electrical wiring interconnecting the first diode and the inverter circuit,
each of the inverter units notifies the controller of an excess notification indicating that a detection value of the bus voltage detected by the voltage detection circuit exceeds a predetermined upper limit value or falls below a predetermined lower limit value, and
Upon being notified of the excess notification, the controller controls the operation of the opening and closing control circuit in the inverter unit to close the first switching element.

5. The transport system according to claim 4, wherein each of the inverter units includes:
an inrush current reduction resistor connected in series to the first switching element between the direct-current power supply and the inverter circuit and to reduce an inrush current flowing to the inverter circuit;
a second switching element connected in parallel to the inrush current reduction resistor; and
a second diode connected in parallel to both the inrush current reduction resistor and the second switching element, and disposed to allow a current to flow in a forward direction from a fourth side of the second diode to a third side of the second diode when a potential on the third side is lower than a potential on the fourth side, the third side being connected to the direct-current power supply, the fourth side being opposite to the third side.

6. The transport system according to claim 1, comprising a controller to control an operation of each of the inverter units, wherein
the controller is configured to communicate with each of the inverter units,
each of the inverter units includes:
an opening and closing control circuit to control opening and closing of the first switching element; and a voltage detection circuit to detect a bus voltage that is a voltage of electrical wiring interconnecting the first diode and the inverter circuit, each of the inverter unit notifies the controller of a detection value of the bus voltage, and the controller controls the operation of the opening and closing control circuit in at least one of the inverter units to close the first switching element on a basis of the detection value of the bus voltage.

7. The transport system according to claim 6, wherein each of the inverter units includes:

an inrush current reduction resistor connected in series to the first switching element between the direct-current power supply and the inverter circuit and to reduce an inrush current flowing to the inverter circuit;

a second switching element connected in parallel to the inrush current reduction resistor; and a second diode connected in parallel to both the inrush current reduction resistor and the second switching element, and disposed to allow a current to flow in a forward direction from a fourth side of the second diode to a third side of the second diode when a potential on the third side is lower than a potential on the fourth side, the third side being connected to the direct-current power supply, the fourth side being opposite to the third side.

8. The transport system according to claim 1, wherein each of the inverter units includes:

an inrush current reduction resistor connected in series to the first switching element between the direct-current power supply and the inverter circuit and to reduce an inrush current flowing to the inverter circuit;

a second switching element connected in parallel to the inrush current reduction resistor; and a second diode connected in parallel to both the inrush current reduction resistor and the second switching element, and disposed to allow a current to flow in a forward direction from a fourth side of the second diode to a third side of the second diode when a potential on the third side is lower than a potential on the fourth side, the third side being connected to the direct-current power supply, the fourth side being opposite to the third side.

9. A transport system comprising:

at least two transport modules each including a coil group and an inverter unit to apply an alternating-current voltage to the coil group; and at least one carriage having a magnet installed thereon to receive an electromagnetic force from the coil group, wherein each of the inverter units includes:

an inverter circuit to have a direct-current voltage applied thereto, the direct-current voltage being output from a common direct-current power supply, and to convert the direct-current voltage into the alternating-current voltage;

a first diode connected between the direct-current power supply and the inverter circuit and disposed to allow a current to flow in a forward direction from a first side of the first diode to a second side of the first diode when a potential on the first side is higher than a potential on the second side, the first side being connected to the direct-current power supply, the second side being opposite to the first side;

a first switching element connected in parallel to opposite ends of the first diode; and an opening and closing control circuit to control opening and closing of the first switching element, wherein the transport system comprises a controller to control an operation of each of the inverter units, wherein the controller is configured to communicate with each of the inverter units, and the controller controls, on a basis of a motion profile of the at least one carriage, an operation of the opening and closing control circuit in at least one of the inverter units.

10. The transport system according to claim 9, wherein each of the inverter units includes:

an inrush current reduction resistor connected in series to the first switching element between the direct-current power supply and the inverter circuit and to reduce an inrush current flowing to the inverter circuit;

a second switching element connected in parallel to the inrush current reduction resistor; and a second diode connected in parallel to both the inrush current reduction resistor and the second switching element, and disposed to allow a current to flow in a forward direction from a fourth side of the second diode to a third side of the second diode when a potential on the third side is lower than a potential on the fourth side, the third side being connected to the direct-current power supply, the fourth side being opposite to the third side.

11. A transport module comprising:

a coil group; and an inverter unit to apply an alternating-current voltage to the coil group and to impart a driving force to a carriage having a magnet installed thereon to receive an electromagnetic force from the coil group, wherein the inverter unit is connected to a common direct-current power supply together with an inverter unit included in another transport module, and the inverter unit includes:

an inverter circuit to have a direct-current voltage applied thereto, the direct-current voltage being output from the direct-current power supply, and to convert the direct-current voltage into the alternating-current voltage;

a capacitor connected in parallel to the inverter circuit at a side of the direct-current power supply as viewed from the inverter circuit;

a first diode connected between the direct-current power supply and the inverter unit and disposed to allow a current to flow in a forward direction from a first side of the first diode to a second side of the first diode when a potential on the first side is higher than a potential on the second side, the first side being connected to the direct-current power supply, the second side being opposite to the first side;

a first switching element connected in parallel to opposite ends of the first diode; and an opening and closing control circuit to control opening and closing of the first switching element, wherein the capacitor stores regenerative power generated when the carriage passes decelerating through, and the opening and closing control circuit closes the first switching element when the regenerative power stored in the capacitor is used as driving power of another transport module.

12. The transport module according to claim 11, wherein the inverter unit includes:

an inrush current reduction resistor connected in series to the first switching element between the direct-current power supply and the inverter circuit and to reduce an inrush current flowing to the inverter circuit;

a second switching element connected in parallel to the inrush current reduction resistor; and a second diode connected in parallel to both the inrush current reduction resistor and the second switching element, and disposed to allow a current to flow in a forward direction from a fourth side of the second diode to a third side of the second diode when a potential on the third side is lower than a potential on the fourth side, the third side being connected to the direct-current power supply, the fourth side being opposite to the third side.

* * * * *